US008428089B2

(12) United States Patent
Noonan et al.

(10) Patent No.: US 8,428,089 B2
(45) Date of Patent: *Apr. 23, 2013

(54) LOCATION-BASED SHARING OF MULTIMEDIA CONTROL RESOURCES

(75) Inventors: Michael E. Noonan, Sandwich, MA (US); Michael C. Silva, East Sandwich, MA (US); Wilson Callan, Sandwich, MA (US)

(73) Assignee: Savant Systems, LLC, Hyannis, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,370

(22) Filed: Jun. 25, 2012

(65) Prior Publication Data

US 2012/0266199 A1    Oct. 18, 2012

Related U.S. Application Data

(63) Continuation of application No. 12/204,032, filed on Sep. 4, 2008, now Pat. No. 8,213,463.

(51) Int. Cl.
*H04W 24/00* (2009.01)
*H04N 7/173* (2011.01)

(52) U.S. Cl.
USPC .................. 370/532; 455/456.1; 725/105

(58) Field of Classification Search .................. 370/532, 370/534, 541; 455/422.1, 456.1–457; 725/105, 725/133, 141, 143, 153; 340/825.49, 825.69, 340/825.72
See application file for complete search history.

(56) References Cited

U.S. PATENT DOCUMENTS

| | | | | |
|---|---|---|---|---|
| 5,675,390 | A * | 10/1997 | Schindler et al. | 715/717 |
| 6,384,737 | B1 * | 5/2002 | Hsu et al. | 340/12.23 |
| 6,563,430 | B1 * | 5/2003 | Kemink et al. | 340/8.1 |
| 6,791,467 | B1 * | 9/2004 | Ben-Ze'ev | 340/12.25 |
| 6,885,362 | B2 * | 4/2005 | Suomela | 345/156 |
| 6,957,075 | B1 * | 10/2005 | Iverson | 455/456.3 |
| 7,154,478 | B2 * | 12/2006 | Usuda | 345/169 |
| 2002/0075161 | A1 * | 6/2002 | Raffel et al. | 340/825.69 |

(Continued)

FOREIGN PATENT DOCUMENTS

WO    WO-2008/033414 A2    3/2008

OTHER PUBLICATIONS

"Notification of Transmittal of the International Search Report and the Written Opinion of the International Searching Authority, or the Declaration," International Filing Date: Sep. 3, 2009, International Application No. PCT/US2009/004977, Applicant: Savant Systems, LLC, Date of Mailing: Feb. 19, 2010, pp. 1-15.

*Primary Examiner* — Michael Thier
*Assistant Examiner* — Prince A Mensah
(74) *Attorney, Agent, or Firm* — Cesari and McKenna, LLP

(57) ABSTRACT

In one embodiment, a multimedia resource is shared among a plurality of devices based upon a physical location of an active wireless endpoint unit within a structure. Devices are associated with corresponding zones within the structure. Each device provides functionality within the device's corresponding zone. Using one of a number of techniques, the physical location of the active wireless endpoint unit is determined to be within a particular zone. In response, one or more devices associated with the particular zone are provided with access to the multimedia control resources. Access is withheld to one or more other devices associated with another zone that is remote from the physical location of the active wireless endpoint unit.

23 Claims, 5 Drawing Sheets

U.S. PATENT DOCUMENTS

| | | |
|---|---|---|
| 2003/0103088 A1* | 6/2003 | Dresti et al. .................. 345/835 |
| 2004/0203874 A1* | 10/2004 | Brandt et al. .............. 455/456.1 |
| 2005/0024227 A1* | 2/2005 | Dunstan ................... 340/825.22 |
| 2005/0096753 A1* | 5/2005 | Arling et al. .................... 700/11 |
| 2007/0132733 A1* | 6/2007 | Ram .............................. 345/163 |
| 2007/0143801 A1* | 6/2007 | Madonna et al. ............... 725/80 |
| 2007/0157258 A1* | 7/2007 | Jung et al. ....................... 725/80 |

* cited by examiner

LOCATION-BASED SHARING OF MULTIMEDIA CONTROL RESOURCES

RELATED APPLICATIONS

The present application is a continuation of U.S. patent application Ser. No. 12/204,032, titled "Location-Based Sharing of Multimedia Control Resources", filed on Sep. 4, 2008 by Michael E. Noonan et al., the contents of which are incorporated by reference herein in their entirety.

BACKGROUND

1. Technical Field

The present disclosure relates generally to multimedia control and more specifically to sharing a limited number of multimedia control resource among a greater number of devices based upon the physical locations of one or more active wireless endpoint units within a structure.

2. Background Information

As consumer electronic devices become more complicated, the burden of controlling such devices has also increased. To partially address this issue, a number of advanced control systems have been developed that attempt to coordinate the operation of multiple consumer electronic devices, while providing a unified, and hopefully intuitive, control interface to a user.

For example, a variety of control systems have been developed to control audio/video (A/V) components, home lighting devices, home automation devices and other types of electronic devices. Such control systems may include one or more centrally located, or distributed, controllers, coupled to devices arrayed throughout a structure, for example a user's home. For instance, a first room of the structure may include a display device, such as a television or monitor, and one or more content source devices, such as a DVD player, a cable box, a media server, etc. Similarly, a second room of the structure may also include a display device, and possibly one or more content source devices. A controller may be coupled to each of these devices, and control, switch signals between and/or otherwise interoperate with the devices. A user may interact with the controller, rather than the individual devices under control. The controller then, in turn, generates appropriate control signals and disseminates these signals to the devices, switches data between the devices, and otherwise causes the devices to operate in a desired manner.

In order to control, switch data between and/or otherwise interoperate with devices, the controller may make use of a number of multimedia control resources. As used herein, the term "multimedia control resource" should be interpreted broadly to encompass a variety of types of special-purpose circuitry, for example, circuitry including one or more application-specific integrated circuits (ASICs) or configured programmable is logic devices (PLDs), as well as general-purpose circuitry, for example, circuitry including one or more processors capable of executing differing software instructions to perform differing tasks, as well as executing software modules, for example, instances of a class in an executing object oriented software program, wherein the special-purpose circuitry or general-purpose circuitry or software modules are operable to perform a function relating to control, switching, or interoperation with one or more devices under control of a controller.

In conventional controllers, a separate multimedia control resource may be provided for each device under the control of the controller that may utilize that type of multimedia control resource. That is, there may be a one-to-one correspondence between a particular type of multimedia control resource and devices that may use that type of resource, up to a maximum number of devices that are supported by the controller. Such a one-to-one arrangement may advantageously allow devices to utilize multimedia control resources whenever they may need to do so, absent any need for resource arbitration. However, overshadowing this advantage, there are a number of significant shortcomings.

Certain hardware-based multimedia control resources may be quite complex and accordingly costly to manufacturer. Thus, to provide a dedicated multimedia control resource for each device that may make use of that type of resource may be quite expensive. This cost typically becomes incorporated into the eventual retail price of the controller. Further, some hardware-based multimedia control resources may consume significant physical space. For example, the circuitry of a particular multimedia control resource may require a significant footprint on one or more circuit boards. In some controllers, internal component space may be at a premium, and space consumed to provide a dedicated control resource for each device may necessitate tradeoffs in other features that may not be included in the controller. Similarly, certain software-based multimedia control resources may consume significant memory and/or processing capacity of a controller. Accordingly, to provide a software based-multimedia control resource for each device may necessitate the use of larger memories and faster processors in the controller, again increasing expense. Likewise, certain software-based multimedia control resources may be subject to certain restrictive licenses. In some cases, to instantiate additional instances of a software-based resource may require the payment of additional licensing fees.

Certain prior controllers have attempted to address these shortcomings by sharing some types of multimedia control resources according to various schemes. However, these prior schemes have largely proven inadequate. Typically, sharing of multimedia control resources has been based upon manual selections entered by a user. For example, a user has manually selected a device with which a multimedia control resource is used. Such manual selection places an increased burden upon the user. Further, incorrect selection may cause the controller to operate in an undesired manner. For example, an unsophisticated user, or a user unfamiliar with the particular controller and the devices coupled thereto, may incorrectly select a device, leading to unexpected results and frustration.

Accordingly, there is a need for an improved system and method that allows for more efficient utilization of multimedia control resources.

SUMMARY

The shortcomings of the prior art are addressed in part by a system and method for sharing one or more multimedia control resources among a plurality of devices based upon the physical location of one or more active wireless endpoint units within a structure. By determining the physical locations of the one or more active wireless endpoint units, the physical locations of users in the structure may be approximated. A controller provides access to multimedia control resources to those devices that provide functionality to portions of the structure proximate users' approximated locations. Devices that provide functionality to other, remote portions of the structure are assumed to be idle, and the controller withholds access to multimedia control resources from these devices. As the physical locations within the structure of the one or more active wireless endpoint units change, the controller redistributes access to the multimedia control resources. In this manner, multimedia control resources are automatically made available to those devices that are likely to actively require them, enabling a limited number (M) of multimedia control resources to be shared by a larger number (N) of devices, absent manual user selection.

In the preferred embodiment, the controller is a programmable multimedia controller and the multimedia control resources are on-screen display (OSD) processing modules that mix graphics, for example, graphics representing an on-screen display, with video images, for example, images of a full-motion video. The location of each wireless endpoint unit may be determined using a combination of two types of wireless communication. A plurality of zone beacons, positioned at differing locations within the structure, each continuously blanket a limited region (i.e., zone) with short-range wireless signals, for example, with infrared (IR) signals. These signals may include a zone identifier (ID) that identifies the physical location of the zone, and a wireless bridge ID that identifies a particular wireless bridge.

A wireless endpoint unit receives a short-range wireless signal from a zone beacon of the zone in which it is currently located. The wireless endpoint then communicates, via long-range wireless signals, with a wireless bridge corresponding to the wireless bridge ID. The wireless endpoint unit transmits the zone ID it received in the short-range wireless signal, thereby identifying the zone in which it is currently located. This information is then passed from the wireless bridge to the programmable multimedia controller. In response, the programmable multimedia controller switches a video source device associated with the zone to a video connection of an OSD processing module. Further, the programmable multimedia controller switches the output connection of the OSD processing module to a display device associated with the zone. In this manner, an OSD processing module is made available for use in the particular zone, while access to the OSD processing module may be withheld from one or more other zones.

BRIEF DESCRIPTION OF THE DRAWINGS

The description below refers to the accompanying drawings, of which.

DETAILED DESCRIPTION

Figure 1:
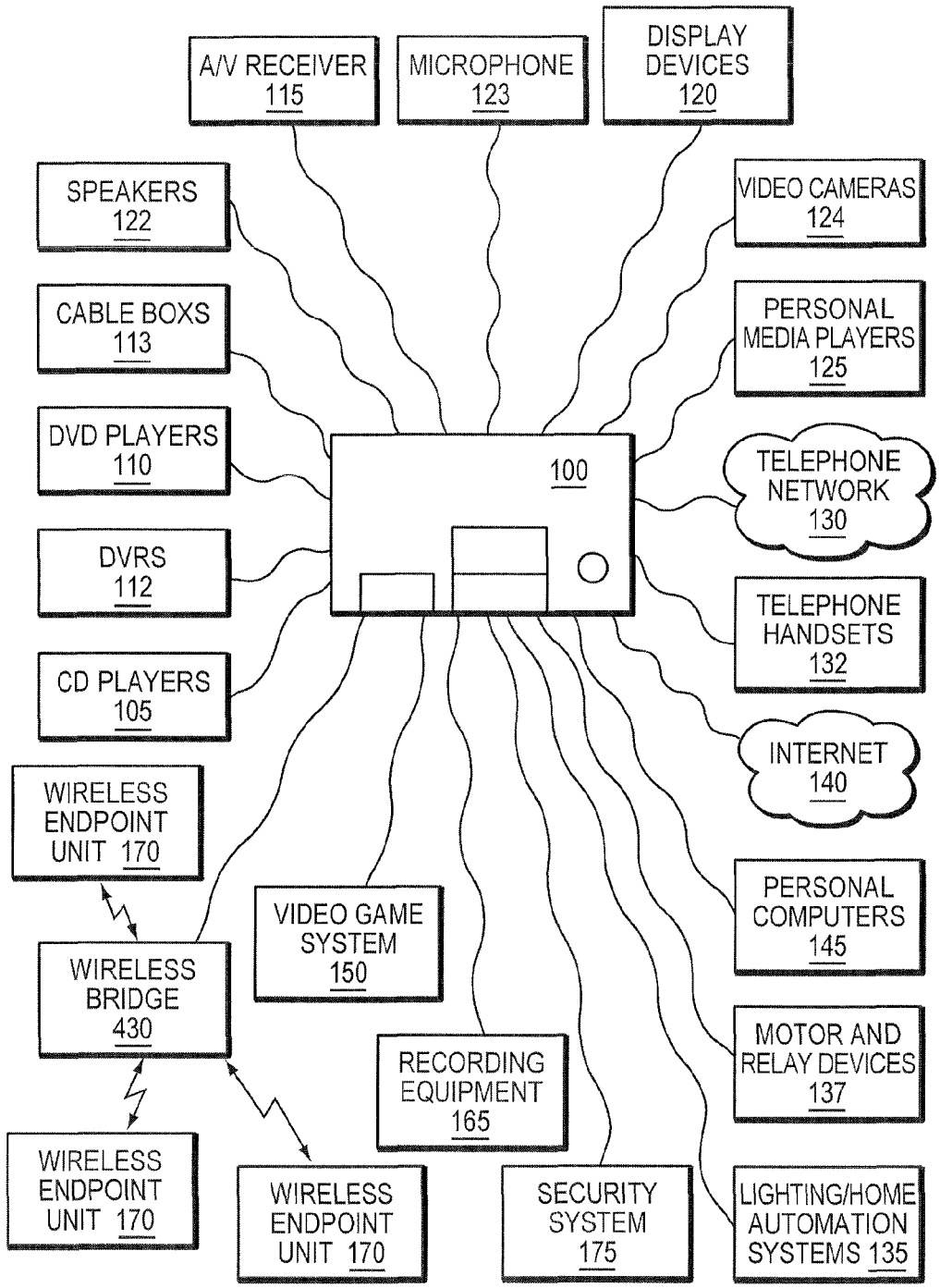
FIG. 1 is a block diagram of an example programmable multimedia controller interconnected to a number of example devices.

FIG. 1 is a block diagram of an example programmable multimedia controller 100 interconnected to a number of devices. The term "programmable multimedia controller" should be interpreted broadly as a device capable of controlling, switching data between, and/or otherwise interoperating with a variety of electrical and electronic devices, such as audio, video, telephony, data, security, motor-operated, relay-operated, and/or other types of devices.

The programmable multimedia controller 100 may connect to a wide range of audio and video components, for example, compact disk (CD) players 105, digital video disc (DVD) players 110, digital video recorders (DVRs) 112, cable boxes 113, audio/video receivers 115, display devices 120, such as televisions or monitors, personal media players 125, speakers 122, microphones 123, and/or video cameras 124. The programmable multimedia controller 100 may also connect to telephony devices, such as a telephone network 130 and/or telephone handsets 132. The telephone network 130 may be a publicly switched telephone network (PSTN), an Integrated Services Digital Network (ISDN), or another type of communications network.

In addition, the programmable multimedia controller 100 may connect to a variety of lighting and/or home automation systems 135. These devices may operate via the X10 protocol developed by Pico Electronics, the INSTEON™ protocol developed by SmartHome, Inc., RS232, or another well known automation or control protocol. Similarly, the controller 100 may connect to motor and/or relay operated devices 137, for example, a heating, ventilation, and air conditioning (HVAC) system, an irrigation system, an automatic window shade or window blind system, and/or other types of systems and devices.

A computer network, such as the Internet 140, preferably connects to the programmable multimedia controller 100. In addition, one or more personal computers (PCs) 145, video game systems 150, home or studio recording equipment 165, or other devices, connect to the controller 100.

As discussed below, in some embodiments, the programmable multimedia controller may be coupled to one or more external wireless bridges 430. Such wireless bridges may communicate with wireless endpoint units 170, which may be used to manage, or to permit other devices to be used to manage, the controller's functionality. As used herein, the term "wireless endpoint unit" should be interpreted broadly to encompass wireless human-machine interface devices, for example, wireless remote control units, wireless keypad units, wireless keyboards, wireless mice, etc., as well as wireless adaptors that couple to a unit that provides a human-machine interface, for example serial port adaptors, infrared (IR) port adapters, Universal Serial Bus (USB) adaptor, or other types of adaptors that couple to a device that includes a human-machine interface.

Figure 2:
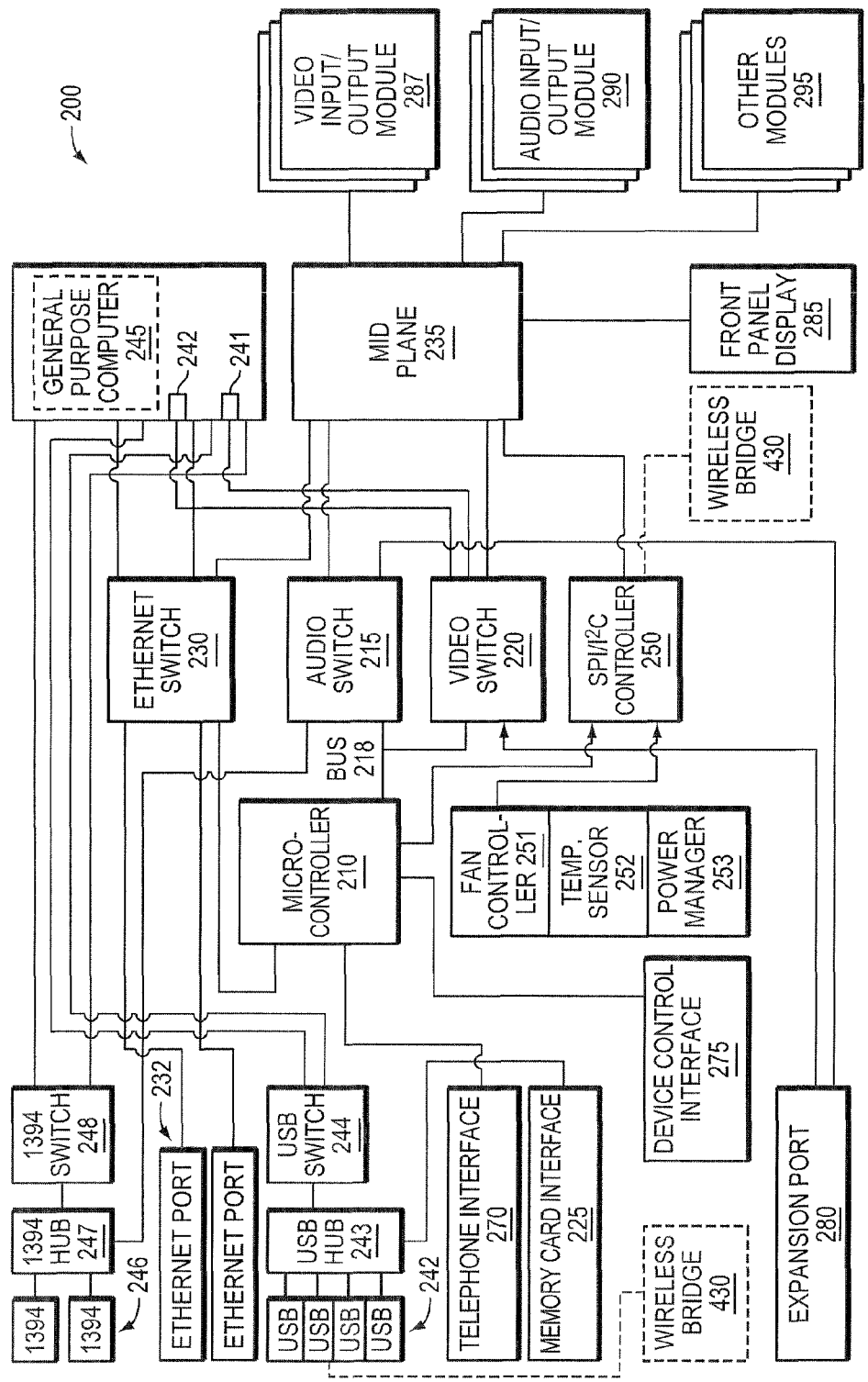
FIG. 2 is a schematic block diagram of an example hardware architecture of the programmable multimedia controller.

FIG. 2 is a schematic block diagram of an example hardware architecture 200 of the example programmable multimedia controller 100. The various components shown may be arranged on a "motherboard" of the controller 100, or on a plurality of circuit cards interconnected by a backplane (not shown). A microcontroller 210 manages the general operation of the controller 100. The microcontroller 210, is coupled to an audio switch 215 and a video switch 220 via a bus 218. The audio switch 215 and the video switch 220 are preferably crosspoint switches capable of switching a number of connections simultaneously. However, many other types of switches capable of switching digital signals may be employed, for example Time Division Multiplexing (TDM) switches or other devices. Further, while two separate switches 215, 220 are shown, audio and video switching may be consolidated into a single switch that supports switching of both types of data.

A mid plane 235 interconnects the audio and video switches 215, 220 to a variety of input and output modules, for example, one or more Video Input/Output Modules 287, one or more Audio Input/Output Modules 290, and/or one or more other modules 295. Such modules may include a plural of connection ports that may be coupled to audio and video components, for example, the CD players 105, DVD players 110, DVRs 112, cable boxes 113, etc. Further details regarding the operation of the one or more Video Input/Output Modules 287, one or more Audio Input/Output Modules 290, and/or one or more other modules 295 may be found in Madonna et al., U.S. patent application Ser. No. 11/314,664, filed Dec. 20, 2005 and titled "System and Method for a Programmable Multimedia Controller", the contents of which are incorporated by reference herein.

The mid plane 235 is further coupled to an Ethernet switch 230 that interconnects Ethernet ports 232 and a processing subsystem 240 to the microcontroller 210. In one embodiment, the processing subsystem 240 includes one or more "general-purpose computers" 245. A general-purpose computer 245, as used herein, refers to a device that is configured to execute a set of instructions, and depending upon the particular instructions executed, may perform a variety of different functions or tasks. Typically, but not always, a general-purpose computer 245 executes a general-purpose operating system, such as the Windows® operating system, available from Microsoft Corporation, the Linux® operating system, available from a variety of vendors, the OSX® operating system, available from Apple Inc., or another operating system. A general-purpose computer 245 may have any of a variety of form factors. For example, a general-purpose computer 245 may be a Central Processing Unit (CPU) card, a Single Board Computer (SBC), a PC/104 processing module, a conventional ATX form factor motherboard and CPU, an "off-the-shelf" small form factor general-purpose personal computer including a case, power supply, and other accessories, an "off-the-shelf" large form factor general-purpose personal computer including a case, power supply, and other accessories, and/or a rack-mount general-purpose personal computer including a case, power supply, and other accessories. The general-purpose computer 245 may include a storage device, for example a hard drive, a Compact Disc read-only memory (CDROM) drive, a Flash memory, or other type of storage device, and/or may be interconnected to a storage device provided elsewhere in the processing subsystem 240.

The processing subsystem 240 preferably has one or more graphics outputs 241, 242 such as analog Video Graphics Array (VGA) connectors, Digital Visual Interface (DVI) connectors, Apple Display Connector (ADC) connectors, or other type of connectors, for supplying graphics. Such graphics outputs 241, 242 may, for example, be supplied directly from the one or more general-purpose computers 245 of the processing subsystem 240. As used herein, the term "graphics" should be interpreted broadly to encompass a wide variety of computer graphics, text, video, still images, or other types of visual data, represented in any of a variety of different color spaces and color depths. The graphics from the processing subsystem 240 are preferably passed to the video switch 220 and then switched to other parts of the programmable multimedia controller 100.

The example programmable multimedia controller 100 may also include a memory card interface and a number of Universal Serial Bus (USB) ports 242 interconnected to a USB hub 243. Such USB ports 242 may be couple to external devices, for example to an external wireless bridge 430 or other types of device. A USB switch 244 is employed to switch USB signals received at the hub to the processing subsystem 240. In a similar manner, a number of IEEE 1394 (FireWire™) ports 246 may be coupled to external devices and pass data to an IEEE 1394 hub 247 and to an IEEE 1394 switch 248, for switching to the processing subsystem 240.

The microcontroller 210 is further connected to a Serial Peripheral Interface (SPI) and Inter-Integrated Circuit ($I^2C$) distribution circuit 250, which provides a serial communication interface to relatively low data transfer rate devices. The SPI/$I^2C$ controller 250 is connected to the mid plane 235 and thereby provides control commands from the microcontroller 210 to the modules 287, 290, 295 of the programmable multimedia controller 100. The SPI/$I^2C$ controller 250 may also provide control commands to an internal wireless bridge 430, whose operation is discussed in more detail below. Further, connections from the SPI/$I^2C$ controller 250 are provided to components such as a fan controller 251, a temperature sensor 252, and a power manager circuit 253, which collectively manage the thermal characteristics of the programmable multimedia controller 100.

The microcontroller 210 is also connected to a device control interface 275 that communicates with lighting, home automation, and motor and/or relay operated devices, a telephone interface 270 that may be coupled to a telephone network and/or telephone handsets. Further, an expansion port 280 is provided for linking several programmable multimedia controllers 100 together, to form an expanded system, while a front panel display 285, for example a touch screen Liquid Crystal Display (LCD) display, is provided to display status, configuration, and/or other information to a user, as well as to accept user input.

The example programmable multimedia controller 100 may include internally, or be coupled to, one or more multimedia control resources. As discussed above, the term "multimedia control resource" should be interpreted broadly to encompass a variety of types of special-purpose circuitry, for example, circuitry including one or more application-specific integrated circuits (ASICs) or configured programmable logic devices (PLDs), as well as general-purpose circuitry, for example, circuitry including one or more processors capable of executing differing software instructions to perform differing tasks, as well as executing software modules, for example, instances of a class in an executing object oriented software program, wherein the special-purpose circuitry or general-purpose circuitry or software modules are operable to perform a function relating to control, switching, or interoperation with one or more devices under control of a controller. Thus, depending on the embodiment, the multimedia control resources may take on a variety of different forms. For example, in some embodiments, the multimedia control resources may be one or more general-purpose computers 245. Likewise, in another embodiment, multimedia control resources may be audio processing and/or control circuitry on an Audio Input/Output module 290. Similarly, in yet another embodiment, the multimedia control resources may be an instance of a software-based surround sound decoder.

In the preferred embodiment, however, the multimedia control resources are on-screen display (OSD) processing modules that mix graphics, for example, graphics representing an interactive on-screen display, with video images, for example, images of a full motion video.

Figure 3:
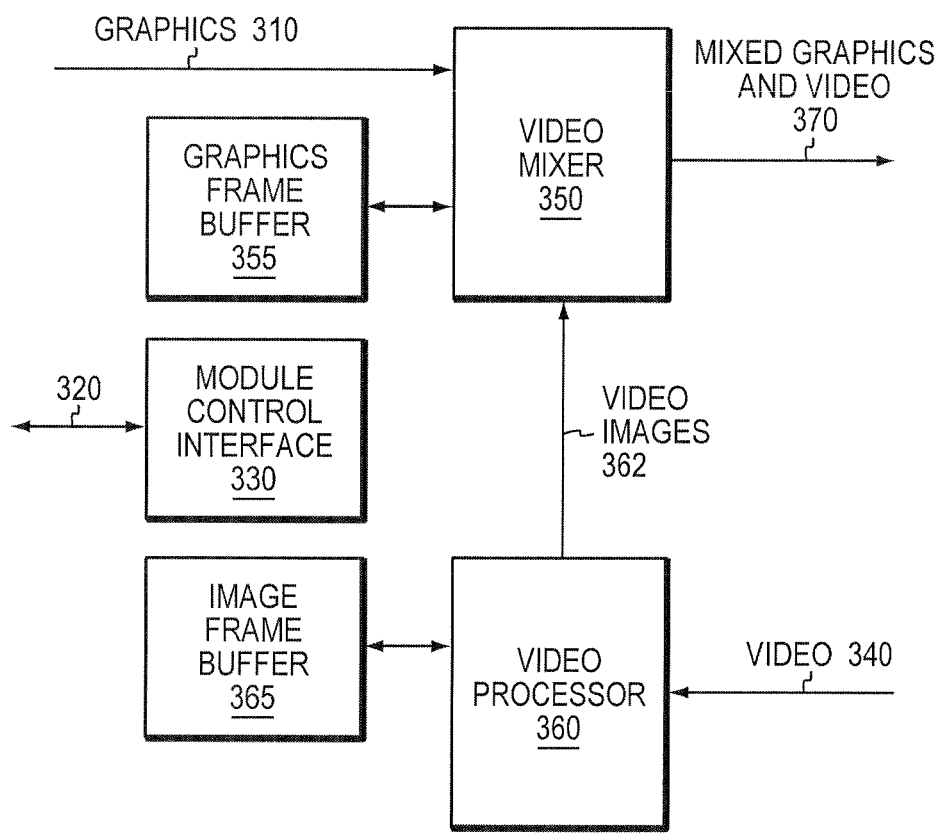
FIG. 3 is a schematic block diagram of an example OSD processing module.

FIG. 3 is a schematic block diagram of an example OSD processing module 300. The OSD processing module 300 may be a portion of a video input/output module 287, may be a separate module 295, may be located in an external device coupled to the programmable multimedia controller 100 via an appropriate interface, or otherwise included in, or accessible, to the controller.

A graphics connection 310 receives graphics, such as computer graphics, text, full-motion video, still images, or other types of visual data. While these graphics may depict any type of representation, in the preferred embodiment, they depict an interactive on-screen display (OSD) comprising menus, status information, and/or other type of interface items. Such graphics may originate from a graphics output 241, 242 of the processing subsystem 240, and may be switched to the OSD processing module 300 via the video switch 220. The graphics may be reformatted and/or subject to color space conversion by a receiver (not shown) of the module 300, in some cases.

In addition to the graphics connection 310, a video connection 340 of the OSD processing module 300 may receive video images, for example, images of a full-motion video. Such video images may originate from an external video source coupled to the programmable multimedia controller 100, for example, from an external DVD player 110, cable box 113, DVR 112, or another type of external video source, or from an internal video source located within the controller 100. Like the graphics signals, the video signals may be switched via the video switch 220 to the video connection 340 of the OSD processing module 300. The video images may be reformatted and/or subject to conversion by an appropriate receiver (not shown), in some cases.

Further, one or more control connections 320 may pass control signals, such as SPI and/or I²C signals, between the microcontroller 210 and a module control interface 330 of the OSD processing module 300. The module control interface 330, in response to the control signals, is configured to issue appropriate control commands to the other components in the OSD processing module 300.

At the heart of the OSD processing module 300 is a video processor 360 and a video mixer 350. The video processor 360, in one configuration, is a 10-bit single-chip dual-channel image processor. The video processor 360 receives video images and performs a variety of scaling, de-interlacing, noise reduction, detail enhancement, brightness control, contrast control, color control and/or other types of processing upon each video image. Video images may be temporarily stored in an image frame buffer 365, such as a double data rate (DDR) synchronous dynamic random access memory (SDRAM). These video images are then passed to the video mixer 350 along a video image link 362.

The video mixer 350 may be a PLD, for example a field programmable gate array (FPGA), yet alternately may be a purpose-built chip, such as an application specific integrated circuit (ASIC), a collection of several chips on a circuit board, and/or another type of device. A graphics frame buffer 355, such as a double data rate (DDR) synchronous dynamic random access memory (SDRAM), interconnected to the video mixer 350, provides temporary storage of graphics.

The video mixer 350 may mix graphics, for example graphics originating from the processing subsystem 240, with video images, for example video images originating from an external video source, according to a color keying technique. Such technique allows graphics to be mixed with video images in any desired region(s), the region(s) chosen on a pixel-by-pixel (or near pixel-by-pixel) basis. In brief, keying and mixing logic internal to the video mixer 350 looks to keying information incorporated into each graphics frame to determine where graphics should be displayed, and where a video image should be displayed. The source of the graphics, for example, the processing subsystem 240, sets color values of the pixels in each graphics frame according to a keying scheme. Specifically, where a video image is desired to be displayed, pixel color values are changed in the graphics frame to one or more predetermined color values. The keying and mixing logic recognizes that pixels are changed to the one or more predetermined color values, and mixes the graphics and the video images in response. In this manner, a mixed image is created that may be displayed to a user. For example, this mixed image may depict an OSD overlaid upon full-motion video, allowing a user to view and/or interact with the OSD while the video is still at least partially visible. Further details regarding the operation of the video mixer 350, and the color keying and mixing technique, may be found in Madonna et al., U.S. patent application Ser. No. 11/687,511, filed on Mar. 16, 2007 and titled "System and Method for Mixing Graphics with Video Images or Other Content," which is incorporated by reference herein.

A mixed graphics and video signal is output from the video mixer 350 via an output connection 370. Such a signal may be passed from the OSD processing module 300 to the video switch 220, and thereafter switched to an appropriate device, for example a display device such as a television or monitor, coupled to a video input/output module 287, or otherwise accessible from the programmable multimedia controller 100. A user may then view and interact with the OSD.

Typically, a user interacts with an OSD by viewing a display device and manipulating a human-machine interface. Such a human-machine interface may be provided directly on a wireless endpoint unit 170. For example, if the wireless endpoint unit 170 is a wireless remote control unit, a wireless keypad unit, or similar unit, a user may manipulate buttons, sensors or other controls on the unit in response to what they view on the OSD. Similarly, if the wireless endpoint unit 170 is a wireless adaptor coupled to a unit that provides a human-machine interface, a user may manipulate this separate unit, and control commands from this separate unit may be converted into wireless signals by the adaptor, for making selections in response to the OSD. In this manner, a user may utilize wireless endpoint units 170, in conjunction with the OSD, to control the programmable multimedia controller 100, which in turn controls the devices under its control.

Users may desire to be able to view an OSD using differing display devices throughout a structure, such as their home. However, at any particular instant in time, users will typically only be viewing a small number (M) of display devices within the structure. That is, while it is desirable to have an OSD accessible on a large number (N) of display devices, concurrent use of an OSD on all these display devices typically does not occur. Only a small number (M) of display devices will typically display an OSD at any particular instant in time. Such behavior is common for other types of multimedia control resources, where typically only a small number (M) of devices require access to multimedia control resources at a time. Thus, it is desirable to support N devices (or device groups) using only M multimedia control resources.

Sharing of M multimedia control resources, such as an OSD processing modules, among N devices (or device groups) is preferably based upon the physical locations of one or more active wireless endpoint units 170 within a structure. By determining the physical locations of the active wireless endpoint units, the physical locations of users in the structure may be approximated. The programmable multimedia controller 100 only provides access to multimedia control resources to devices (or device groups) that are located proximate to, or are configured to provide functionality proximate to, the approximated users' locations. For instance, an OSD processing module may be switched to output mixed graphics and video signals to a display device located in a particular room in which a user is believed to be located, and to receive a video signal from a video source, such as a cable box, associated with the display device in that room. Devices (or device groups) that provide functionality to other remote portions of the structure are assumed to be idle, and the programmable multimedia controller 100 withholds access to multimedia control resources from these devices. For instance, access to an OSD processing module may be withheld from a display device, and associated video source, located in a room distant from the approximated locations of any users. As the physical location of the one or more active wireless endpoint units changes, the programmable multimedia controller 100 continuously redistributes access to the multimedia control resources. In this manner, M multimedia control resources, such as OSD processing modules, may efficiently support N devices (or device groups) that utilize that type of resource.

Figure 4:
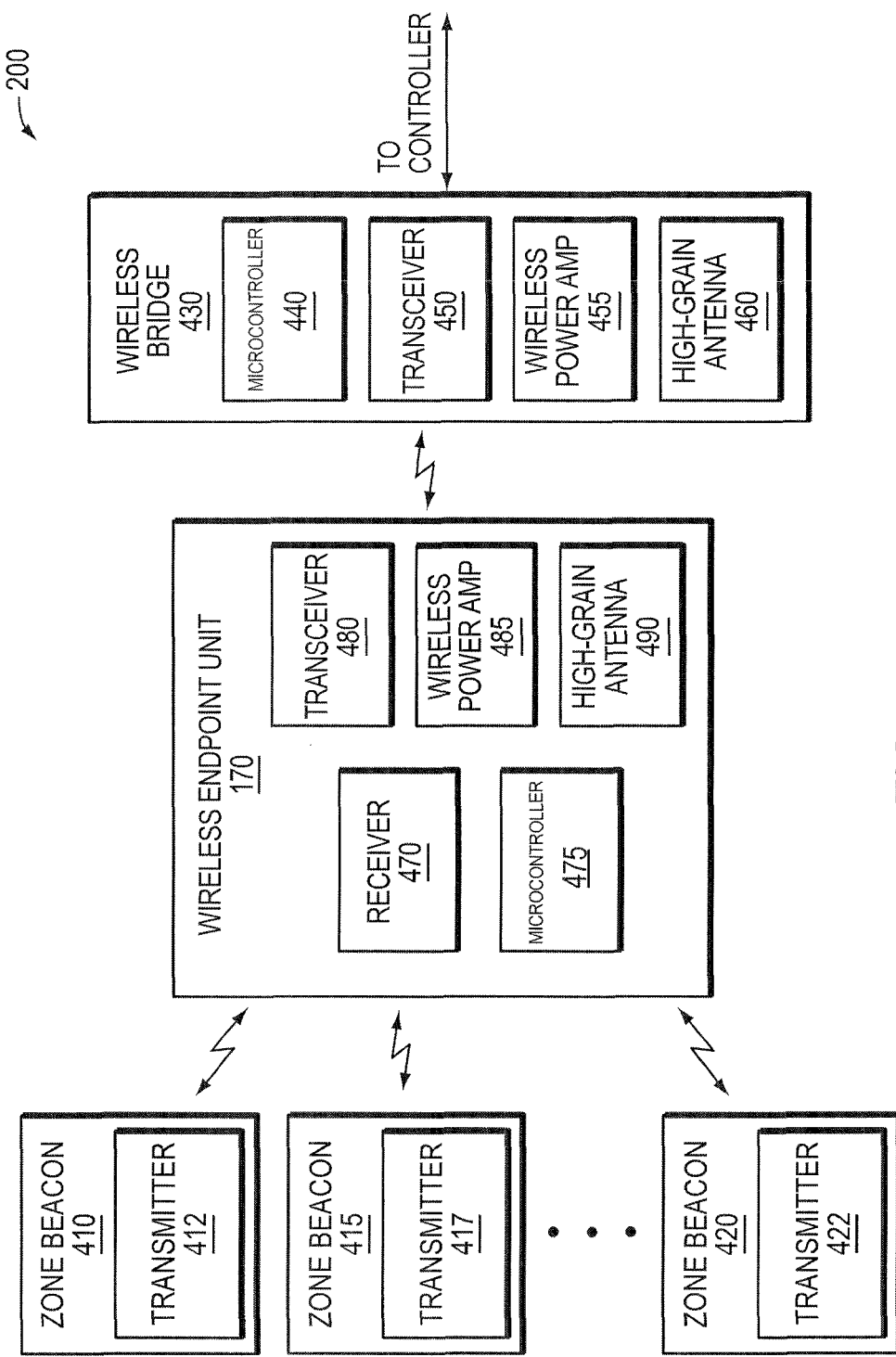
FIG. 4 is a schematic block diagram of an example wireless location determination architecture.

In the preferred embodiment, the location of active wireless endpoint units 170 is determined using a combination of two types of wireless communication. FIG. 4 is a schematic block diagram of an example wireless location determination architecture. A plurality of zone beacons 410, 415, 420 are positioned at differing locations within a structure, for example in differing rooms of a home. The zone beacons may be stand alone devices, or may be incorporated into other devices, for example into a display device, a content source device, etc. Each of the zone beacons 410, 415, 420 includes a short-range wireless transmitter 412, 417, 422. In the preferred embodiment, the short-range wireless transmitters are IR blasters that include a plurality of IR transmitters that continuously blanket a limited region (i.e., zone) about the zone beacon with IR signals. Alternately, however, the short-range wireless transmitters may be differing types of transmitter, for example, Bluetooth transmitters, Wireless USB transmitters, Wibree transmitters, low-power RF transmitters, or other types of short-range wireless transmitters.

Collectively the zone beacons 410, 415, 420 divide the structure into a number of zones, each zone blanketed with a short-range wireless signal from a differing zone beacon. The signal from each zone beacon includes a zone identifier (ID) that identifies the physical location of the zone beacon 410, 415, 420. The signal from each zone beacon may also include a wireless bridge ID, which uniquely identifies a particular wireless bridge 430, of one or more wireless bridges, positioned within the structure.

Each wireless bridge 430 may be an internal component of a programmable multimedia controller 100 or another host device, or alternately may be located externally and coupled thereto, via a data link, for example, a USB link or an Ethernet link. A wireless bridge 430 includes a microcontroller 440, for example, a programmable system-on-chip (PSoC), as well as a long-range wireless transceiver 450. The range of the long-range wireless transceiver 450 may be enhanced by use of a wireless signal power amplifier 455, and, in some configurations, a high-gain antenna 460. In this manner, the long-range wireless transceiver 450 may communicate with devices located across a plurality of different zones.

In the preferred embodiment the long-range wireless transceiver 450 is a RF transceiver. Alternately, however, the long-range wireless transceiver 450 may be a different type of transceiver, for example, a Wi-Fi transceiver, ZigBee transceiver, or another type of transceiver.

One or more wireless endpoint units 170 are preferably located within the structure. Each wireless endpoint unit 170 may be positioned at a relatively fixed location, or may be movable about the structure by a user, i.e., carried from zone to zone within the structure by a user. Each wireless endpoint unit 170 may include differing components depending on its particular form. For example, if a wireless endpoint unit 170 is a human-machine interface device, such as a remote control unit or keypad, components to support such functionality may be present, while if the wireless endpoint unit is an adapter, differing components may be employed. However, regardless of its particular form, a wireless endpoint unit 170 generally includes a short-range wireless receiver 470, such as an IR receiver, to receive signals from the zone beacon of the zone in which the wireless endpoint units 170 is currently located. The short-range wireless receiver 460 is coupled to a microcontroller 475, for example, a PSoC, which may read the wireless bridge ID from the signal. The microcontroller 475 then directs a long-range wireless transceiver 480 of the wireless endpoint unit 170 to communicate with, i.e., bind to, a particular wireless bridge 430 that is associated with the wireless bridge ID. In some configurations, the range of the long-range wireless transceiver 480 may be enhanced by use of a wireless power amplifier 485 and a high-gain antenna 490.

Once bound to a particular wireless bridge 430, the microcontroller 475 preferably causes the long-range wireless transceiver 480 to transmit the zone ID, received in the short-range wireless signal, to the wireless bridge 430, thereby identifying the zone in which the wireless endpoint unit 170 is currently located. This information is then passed, either directly or indirectly, to the programmable multimedia controller 100, where it may be processed and retained, for example, by the processing subsystem 240. The wireless endpoint 170 may retransmit the zone ID at predetermined time intervals. Further, in response to detecting the wireless endpoint unit 170 has moved between zones, and is receiving signals from a new zone beacon, the wireless endpoint 170 preferably transmits a new zone ID to the wireless bridge 430.

Figure 5:
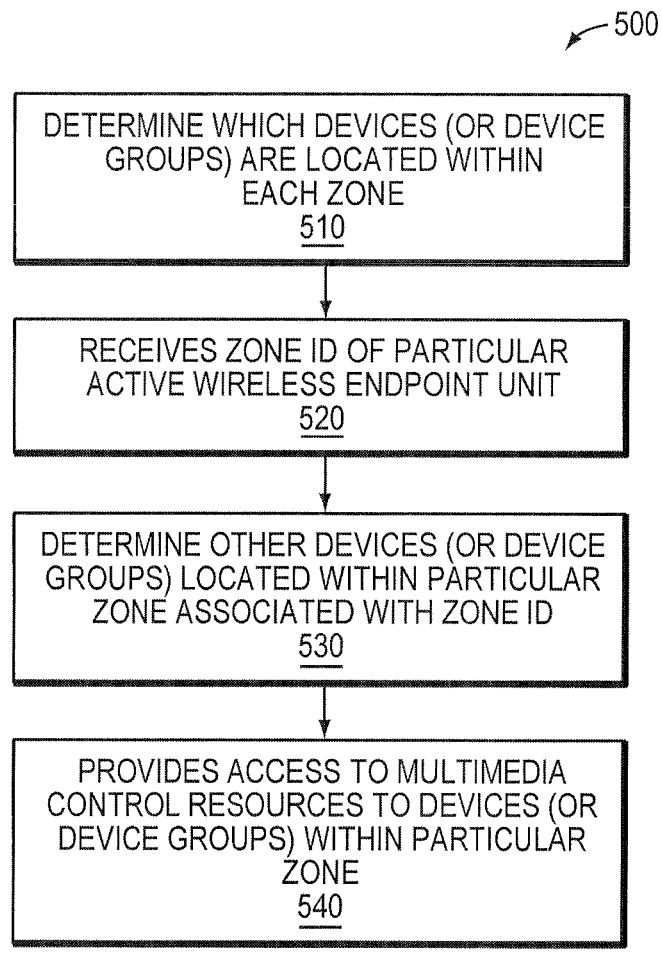
FIG. 5 is a flow diagram of an example sequence of steps to share one or more multimedia control resource among a plurality of devices (or device groups) based upon the physical locations of one or more active wireless endpoint units.

FIG. 5 is a flow diagram of an example sequence of steps 500 to automatically share one or more multimedia control resource among a plurality of devices (or device groups) based upon the physical location of one or more active wireless endpoint units 170. At step 510, the programmable multimedia controller 100 may be programmed with, or may actively determine, which devices (or device groups) are located within, or are configure to provide functionality to, each of the zones within a structure. If such information is actively determined, a technique similar to that used with the wireless endpoint units 170 may be employed. A device-to-zone mapping is generated which may be retained in a data structure, for example in a database. Such a device-to-zone mapping may be relatively static for some types of devices, while, for other more portable devices, may require periodic update to reflect changing device locations. At step 520, the controller 100 receives the zone ID of a particular active wireless endpoint unit 170. At step 530, the programmable multimedia controller 100 accesses the device-to-zone mapping and determines which other devices (or device groups) are located within, or are configure to provide functionality within the particular zone. At step 540, the programmable multimedia controller 100 provides access to one or more multimedia control resources to devices (or device groups) that have been determined to be located within, or are configure to provide functionality within, the particular zone. For example, in the preferred embodiment, where the multimedia control resources are OSD processing modules 300, the programmable multimedia controller 100, via the video switch 220, may switch a video source associated with the zone to the video connection 340 of an OSD processing module 300. Further, the video switch 220 may switch the output connection 370 of the OSD processing module 300 to a display device associated with the zone. In this manner, the OSD processing module 300 may be made available for use in the zone. Devices (or device groups) that provide functionality to other, remote zones of the structure are assumed to be idle, and the controller 100 withholds access to multimedia control resources, such as OSD processing modules, from these devices. In this manner, M multimedia control resources, such as OSD processing modules, may efficiently support N devices (or device groups) that utilize that type of resource.

While the above description discusses certain preferred embodiments, it should be apparent that a number of modifications and/or additions may be made.

For example, while it is discussed above that each zone beacon 410, 415, 420 blankets discrete and separate zones with signals, this may not always be the case. In some situations, a wireless endpoint unit 170 may receive signals from multiple zone beacons. This may be intentional, for example a multi-zone space may be established, or unintentional, for example, due to reflections or over-extension of wireless signals. In some configurations, the wireless endpoint unit 170 may be configured by a user operating a user interface element, for example a button, that causes the wireless endpoint 170 to switch among zones, i.e., to switch between utilizing the signals from multiple zone beacons.

Further, while it is discussed above that each zone has a single zone beacon that transmits a particular zone ID, in certain alternate configurations, multiple zone beacons may be used within a single zone, each transmitting the same zone ID. In this manner, zones of larger size may be established, and/or better signal coverage may be provided within a zone.

Further, while it is discussed above that the location of each wireless endpoint 170 is determined using short-range wireless communication with a wireless beacon, and long-range wireless communication with a wireless bridge 430, a variety of other location determination techniques may alternately be employed. For example, the location of each wireless endpoint 170 may be determined by triangulation among signals provided by three or more transmitter units. The triangulated location may then be transmitted from the wireless endpoint unit 170 to the wireless bridge 430. Alternately, each wireless endpoint unit 170 may include a global positioning system (GPS) receiver that determines a precise location from received GPS signals. This location may then be transmitted from the wireless endpoint 170 to the wireless bridge 430. In yet another alternative configuration, the location of each wireless endpoint unit 170 may be determined by manual means. For example, a user may manual identify their present position, such as by operating a human-machine interface of the wireless endpoint unit 170. This position may then be sent to the wireless bridge 430.

Further, while it is discussed above that a multimedia control resource is shared among a plurality of devices based upon the physical location of one or more active wireless endpoint units, other types of resources may be shared. For example, in an alternate configuration, a multimedia source resource may be shared using the above described techniques. As used herein, the term "multimedia source resource" should be interpreted broadly to encompass a variety of different types of devices that may provide multimedia content, for example cable boxes 113, DVD players 112, CD players 105, personal computers 145, digital media servers, or other types of devices that may output multimedia content. Further, as used herein, the term "multimedia resource" should be interpreted to encompass both multimedia control resources and multimedia source resources, to provide a shorthand reference to such resources.

Additionally, the procedures or processes described above may be implemented in hardware, software (embodied as a computer-readable medium having program instructions), firmware, or a combination thereof. A computer-readable medium may take the form of a memory, such as a Random Access Memory (RAM), a disk, such as a CD-ROM, or other appropriate tangible form.

Therefore, it should be understood that the above descriptions are meant to be taken only by way of example.

What is claimed is:

1. A method for sharing a multimedia resource among a plurality of devices based upon a physical location of a wireless endpoint unit within a structure, the method comprising:
   associating each of the plurality of devices with a corresponding zone within the structure, each device to provide functionality within the device's corresponding zone;
   determining that the physical location of the wireless endpoint unit is within a first zone within the structure;
   in response to the determining that the physical location of the wireless endpoint unit is within the first zone, providing, by a controller, one or more devices associated with the first zone with access to the multimedia resource, and withholding access to the multimedia resource from one or more other devices associated within a second zone within the structure that is remote from the physical location of the wireless endpoint unit;
   determining that the physical location of the wireless endpoint unit has changed to be within the second zone;
   in response to the determining that the physical location has changed to be within the second zone, providing, by the controller, the one or more other devices that are associated with the second zone with access to the multimedia resource, and withholding access to the multimedia resource from the one or more devices that are associated with the first zone,
   wherein the multimedia resource is separate from the wireless endpoint unit and is operable to function with the one or more devices associated within the first zone or the one or more other devices associated within the second zone.

2. The method of claim 1 wherein the wireless endpoint unit is an active wireless endpoint unit being used by a user, such that the physical location of the wireless endpoint unit within the structure indicates an approximate physical location of the user within the structure.

3. The method of claim 1, wherein the wireless endpoint unit is an active wireless remote control unit.

4. The method of claim 1, wherein the multimedia resource is a multimedia control resource.

5. The method of claim 1, wherein the multimedia resource is a multimedia source resource.

6. The method of claim 1, wherein the multimedia resource includes special purpose circuitry and/or general-purpose circuitry operable to function with the one or more devices associated within the first zone or with the one or more other devices associated within the second zone.

7. The method of claim 1, wherein the one or more devices and the one or more other devices include one or more display devices.

8. The method of claim 1, wherein the multimedia resource is one of M multimedia resources, and the plurality of devices are N devices, wherein M and N are integers and M is less than N.

9. The method of claim 1, wherein the determining that the physical location of the wireless endpoint unit is within the first zone comprises:
   receiving a first short-range wireless signal from a beacon in the first zone, the first short-range wireless signal including a zone identifier (ID) that identifies the first zone,
and the determining that the physical location of the wireless endpoint unit has changed to be within the second zone comprises:

receiving a second short-range wireless signal from a zone beacon in the second zone, the second range wireless signal including a zone ID that identifies the second zone.

10. The method of claim 9, wherein the determining that the physical location of the wireless endpoint unit is within the first zone further comprises:
transmitting from the wireless endpoint unit a long-range wireless signal that includes the zone ID that identifies the first zone,
and the determining that the physical location of the wireless endpoint unit has changed to be within the second zone comprises:
transmitting from the wireless endpoint unit a long-range wireless signal that includes the zone ID from that identifies the second zone.

11. The method of claim 10, wherein the short-range wireless signal includes an infrared (IR) wireless signal and the long-range wireless signal includes a radio frequency (RF) wireless signal.

12. The method of claim 1, wherein the determining that the physical location of the wireless endpoint unit is within the first zone comprises:
receiving an indication of the physical location is within the first zone on a human-machine interface of the wireless endpoint unit,
and the determining that the physical location of the wireless endpoint unit has changed to be within the second zone comprises:
receiving an indication of the physical location is within the second zone on a human-machine interface of the wireless endpoint unit.

13. A system comprising:
a wireless endpoint unit that is movable about a structure by a user;
a multimedia resource separate from the wireless endpoint unit, the multimedia resource operable to function with one or more devices associated with a first zone within the structure or with one or more device associated with a second zone within the structure; and
a controller configured to:
learn a physical location of the wireless endpoint unit within the structure,
in response to the physical location of the wireless endpoint unit being within the first zone within the structure, provide the one or more devices associated with the first zone with access to the multimedia resource, and
in response to the physical location of the wireless endpoint unit being changed to be within the second zone within the structure, provide the one or more other devices that are associated with the second zone with access to the multimedia resource.

14. The system of claim 13, wherein the wireless endpoint unit is an active wireless endpoint unit being used by the user, such that the physical location of the wireless endpoint unit within the structure indicates an approximate physical location of the user within the structure.

15. The system of claim 13, wherein the wireless endpoint unit is an active wireless remote control unit.

16. The system of claim 13, wherein the multimedia resource is a multimedia control resource.

17. The system of claim 13, wherein the multimedia resource is a multimedia source resource.

18. The system of claim 13, wherein the multimedia resource includes special purpose circuitry and/or general-purpose circuitry operable to function with the one or more devices associated within the first zone or with the one or more other devices associated within the second zone.

19. A system comprising:
a wireless endpoint unit that is movable about a structure;
software configured to
in response to the physical location of the wireless endpoint unit being within a first zone within the structure, provide one or more devices associated with the first zone with access to the multimedia resource, and withhold access to the multimedia resource from one or more other devices associated within a second zone within the structure that is remote from the physical location of the wireless endpoint unit; and
in response to the physical location has having changed within the structure to be within the second zone within the structure, provide the one or more other devices that are associated with the second zone with access to the multimedia resource, and withhold access to the multimedia resource from the one or more devices that are associated with the first zone,
wherein the multimedia resource is separate from the wireless endpoint unit and is operable to function with the one or more devices associated within the first zone or with the one or more other devices associated within the second zone.

20. The system of claim 19, wherein the wireless endpoint unit is an active wireless endpoint unit.

21. The system of claim 19, wherein the multimedia resource is a multimedia control resource.

22. The system of claim 19, wherein the multimedia resource is a multimedia source resource.

23. The system of claim 19, wherein the multimedia resource includes special purpose circuitry and/or general-purpose circuitry operable to function with the one or more devices associated within the first zone or with the one or more other devices associated within the second zone.

* * * * *

UNITED STATES PATENT AND TRADEMARK OFFICE
CERTIFICATE OF CORRECTION

PATENT NO. : 8,428,089 B2
APPLICATION NO. : 13/532370
DATED : April 23, 2013
INVENTOR(S) : Michael E. Noonan et al.

It is certified that error appears in the above-identified patent and that said Letters Patent is hereby corrected as shown below:

In the Specifications

In col. 1, line 54 should read as follows:
grammable is-logic devices (PLDs), as well as general-pur- Signed and Sealed this
Twenty-fifth Day of June, 2013

Teresa Stanek Rea
*Acting Director of the United States Patent and Trademark Office*